(12) United States Patent
Chen et al.

(10) Patent No.: US 9,212,610 B2
(45) Date of Patent: Dec. 15, 2015

(54) ENGINE DIAGNOSTICS WITH SKIP FIRE CONTROL

(71) Applicant: Tula Technology Inc., San Jose, CA (US)

(72) Inventors: Shikui Kevin Chen, San Jose, CA (US); Xin Yuan, Palo Alto, CA (US); Joshua P. Switkes, Menlo Park, CA (US); Steven E. Carlson, Oakland, CA (US); Mark A. Shost, Northville, MI (US)

(73) Assignee: Tula Technology, Inc., San Jose, CA (US)

( * ) Notice: Subject to any disclaimer, the term of this patent is extended or adjusted under 35 U.S.C. 154(b) by 115 days.

(21) Appl. No.: 14/206,918

(22) Filed: Mar. 12, 2014

(65) Prior Publication Data

US 2014/0261309 A1 Sep. 18, 2014

Related U.S. Application Data

(60) Provisional application No. 61/799,180, filed on Mar. 15, 2013.

(51) Int. Cl.
*F02D 17/02* (2006.01)
*F02D 17/00* (2006.01)
(Continued)

(52) U.S. Cl.
CPC .............. *F02D 17/02* (2013.01); *F02D 17/00* (2013.01); *F02D 37/02* (2013.01); *F02D 41/00* (2013.01);
(Continued)

(58) Field of Classification Search
CPC ......... F02D 17/00; F02D 17/02; F02D 37/02; F02D 41/00; F02D 41/0087; F02D 2041/2027; F02D 2250/18; Y02T 10/44; Y02T 10/46
USPC ................. 123/305, 320, 349, 350, 478, 520, 123/406.11, 406.12, 406.19, 406.23, 198 F; 701/102–105, 112, 114; 73/114.03, 73/114.08, 114.46, 114.63
See application file for complete search history.

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

JP 2009-144627 7/2009

OTHER PUBLICATIONS

International Search Report dated Jul. 10, 2014 from International Application No. PCT/US2014/024941.
(Continued)

*Primary Examiner* — John Kwon
*Assistant Examiner* — Johnny H Hoang
(74) *Attorney, Agent, or Firm* — Beyer Law Group LLP

(57) ABSTRACT

Methods and devices are described for performing engine diagnostics during skip fire operation of an engine while a vehicle is being driven. Knowledge of the firing sequence is used to determine appropriate times to conduct selected diagnostics and/or to help better interpret sensor inputs or diagnostic results. In one aspect, selected diagnostics are executed when a single cylinder is fired a plurality of times in isolation relative to a sensor used in the diagnosis. In another aspect, selected diagnostics are conducted while the engine is operated using a firing sequence that insures that no cylinders in a first cylinder bank are fired for a plurality of engine cycles while cylinders in a second bank are at least sometimes fired. The described tests can be conducted opportunistically, when conditions are appropriate, or specific firing sequences can be commanded to achieve the desired isolation or skipping of one or more selected cylinders.

28 Claims, 5 Drawing Sheets

(51) Int. Cl.
*F02D 37/02* (2006.01)
*F02D 41/00* (2006.01)
*F02D 41/20* (2006.01)

(52) U.S. Cl.
CPC ..... *F02D 41/0087* (2013.01); *F02D 2041/2027* (2013.01); *F02D 2250/18* (2013.01); *Y02T 10/44* (2013.01)

(56) References Cited

U.S. PATENT DOCUMENTS

| | | | |
|---|---|---|---|
| 4,509,488 A | 4/1985 | Forster et al. | |
| 5,278,760 A | 1/1994 | Ribbens et al. | |
| 5,377,631 A | 1/1995 | Schechter | |
| 5,553,575 A | 9/1996 | Beck et al. | |
| 5,584,281 A | 12/1996 | Katoh et al. | |
| 5,734,100 A | 3/1998 | Kishimoto et al. | |
| 5,945,597 A | 8/1999 | Poublan et al. | |
| 6,158,411 A | 12/2000 | Morikawa | |
| 6,360,724 B1 | 3/2002 | Suhre et al. | |
| 6,415,601 B1 | 7/2002 | Glugla et al. | |
| 6,591,666 B1 | 7/2003 | Kacewicz et al. | |
| 6,619,258 B2 | 9/2003 | McKay et al. | |
| 7,063,062 B2 | 6/2006 | Lewis et al. | |
| 7,086,386 B2 | 8/2006 | Doering | |
| 7,188,023 B1 | 3/2007 | O'Daniel et al. | |
| 7,900,509 B2 | 3/2011 | Feldkamp et al. | |
| 7,930,087 B2 | 4/2011 | Gibson et al. | |
| 2002/0116917 A1 | 8/2002 | Glugla et al. | |
| 2003/0187565 A1* | 10/2003 | Wong | F02D 19/027 701/103 |
| 2009/0301060 A1 | 12/2009 | Kennie et al. | |
| 2010/0050993 A1 | 3/2010 | Zhao et al. | |
| 2010/0154738 A1 | 6/2010 | Tsukamoto et al. | |
| 2010/0286891 A1 | 11/2010 | Huang et al. | |
| 2010/0288035 A1 | 11/2010 | Arakawa | |
| 2011/0030657 A1 | 2/2011 | Tripathi et al. | |
| 2011/0197860 A1 | 8/2011 | Aso et al. | |
| 2013/0118443 A1* | 5/2013 | Tripathi | F02D 17/02 123/198 F |
| 2013/0255626 A1* | 10/2013 | Serrano | F02D 41/0087 123/350 |
| 2013/0289853 A1* | 10/2013 | Serrano | F02D 45/00 701/110 |

OTHER PUBLICATIONS

Written Opinion dated Jul. 10, 2014 from International Application No. PCT/US 2014/024941.

International Preliminary Report on Patentability dated Feb. 13, 2015 from International Application No. PCT/US2014/024941.

* cited by examiner

FIG. 2

ENGINE DIAGNOSTICS WITH SKIP FIRE CONTROL

RELATED APPLICATIONS

This application claims priority of U.S. Provisional Application No. 61/799,180, filed Mar. 15, 2013, which is incorporated herein by reference.

BACKGROUND OF THE INVENTION

The present invention relates generally to powertrain diagnostics conducted during skip fire control of an internal combustion engine.

Skip fire engine control is understood to offer a number of benefits including the potential of increased fuel efficiency. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

When a cylinder is deactivated in a variable displacement engine, its valves are not actuated and although the piston typically still reciprocates, fuel is not combusted during the power stroke. Since the cylinders that are "shut down" don't deliver any net power, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered and/or combusted during skipped working cycles when such valve deactivation mechanism is available. Often, no air is introduced to the deactivated cylinders during the skipped working cycles thereby reducing pumping losses. However, in other circumstances it may be desirable to trap exhaust gases within a deactivated cylinder, or to introduce, but not release air from a deactivated cylinder during selected skipped working cycles. In such circumstances, the skipped cylinder may effectively act as a gas spring. Although deactivating skipped cylinders is generally preferred, it should be appreciated that in some engines or during some working cycles it may not be possible, or in some situations desirable, to truly deactivate cylinders. When a cylinder is skipped, but not deactivated, intake gases drawn from the intake manifold are effectively pumped through the cylinder during the skipped working cycle.

Most modern passenger vehicles operate with four stroke, internal combustion engines powered by gasoline or similar fuels. These vehicles are typically equipped with one or more catalytic converters incorporated into the exhaust system to reduce environmentally harmful emissions. The catalytic converts may use a three way catalyst, which simultaneously provides sites for reducing and oxidizing chemical reactions. Specifically, the catalyst oxidizes carbon monoxide to carbon dioxide and hydrocarbons to carbon dioxide and water. It also reduces nitrogen oxides to $N_2$ and $O_2$. To effectively operate the catalyst must alternately be exposed to oxidizing and reducing exhaust streams, so that neither the oxidizing nor reducing sites become saturated and lose their effectiveness. This is typically done by varying the fuel/air ratio about the stoichiometric point during normal engine operation.

Although the concept of skip fire control has been around for a long time, it has not traditionally been used in the control of commercially available engines, so an additional challenge to implementing skip fire control is insuring that the engine's other engine/powertrain systems work effectively during skip fire control. One such system relates to engine diagnostics. As is well understood by those familiar with the art, modern engine management systems perform a significant amount of diagnosis of components related to engine emissions control function while the engine is operating. These diagnostic systems are often referred to as "On-Board Diagnostics" (OBD) systems and there are a number of engine diagnostic protocols that are performed while the engine is running. Modern OBD systems store and report a significant amount of information concerning the operation and state of health of various vehicle sub-systems including the powertrain. To assist in reporting, a number of standardized diagnostic monitor routines, active tests, and associated trouble codes (known as OBD-II codes) have been developed to report the detection of specific perceived malfunctions.

Many of the diagnostics protocols relate to environmental issues. Currently, many countries have regulations requiring that engines monitor and regulate emissions during use. Some jurisdictions also require periodic or continuous monitoring of the condition of various components and sensors used in the emissions control process. These may include regulations that require the testing of catalytic converters (or other emissions control devices) used in the exhaust system and/or testing of the sensors (e.g., oxygen sensors) used to monitor emissions during operation. By way of example, in the United States, there are a number of federal and state (notably California) regulations that mandate the performance of certain tests continuously, every engine on/off cycle, or at other prescribed intervals during use. One such set of regulations relating to malfunction and diagnostic systems requirements is articulated in California Code of Regulations (CCR), Title 13, Section 1968.2. Of course many other jurisdictions have their own sets of engine diagnostics requirements.

By way of example, Title 13 of the CCR, §1968.2(e)(6.2.2) requires that if a vehicle is equipped with adaptive feedback control, the OBD-II system must include a Fuel System Monitor that can detect/report a malfunction when the adaptive feedback control has used up all of the adjustment allowed by the manufacture. 1968.2(e)(6.2.1)(C) requires a Cylinder Imbalance Monitor that monitors air-fuel ratio imbalances between different cylinders. 1968.2(e)(1.2.1) requires a Catalyst Efficiency Monitor capable detecting a catalyst system malfunction when the catalyst system's conversion capability decreases to certain levels. Each of those monitors typically requires inputs from the oxygen sensors. Therefore, the efficacy of the oxygen sensors themselves must be monitored as well. In practice some of these tests can be challenging to run during normal operation of the engine, in part because specific operating conditions are desired for the execution and constraining the engine to operate in a testing mode may interfere with the driver's desired operation.

Furthermore, although existing OBD systems generally work well, several of the diagnostics algorithms are not well suited for use when an engine is operated in a skip fire manner. The present application describes various techniques and protocols that are well adapted for performing and enhancing diagnostics while an engine is operated in a skip-fire operational manner.

SUMMARY

Various improved methods and devices are described for performing engine diagnostics during skip fire operation of an engine while a vehicle is being driven. In general, knowledge of the firing pattern (or other parameter that can be used to infer a firing sequence) is used to determine appropriate times to conduct selected diagnostics and/or to help better interpret sensor inputs or diagnostic results.

In one aspect, selected diagnostics are executed at times when only a single cylinder out of a group of cylinders is fired a plurality of times in isolation relative to a particular sensor used in the diagnosis. In some applications, this gives the diagnostic algorithms the ability to analyze the isolated cylinder with little or no interference from neighboring cylinders. By way of example, fuel trim diagnostics and various types of misfire detection tests can benefit from this type of approach.

In another aspect selected diagnostics may be conducted (or at least initiated) while the engine is operated using a firing sequence that insures that no cylinders in a first cylinder bank are fired over a period of time that includes a plurality of engine cycles while cylinders in a second bank are at least sometimes fired. By way of example, catalyst and oxygen sensor monitors can benefit from this type of approach. During some such tests or portions of a test, a controlled amount of air may be pumped through the skipped cylinders as required by specific diagnostic being conducted.

The described tests can be conducted opportunistically, when the operating conditions are right, or specific firing patterns/sequences can be commanded to achieve the desired isolation or skipping of one or more selected cylinders.

Control units and algorithms for conducting such tests are also described.

BRIEF DESCRIPTION OF THE DRAWINGS

The invention and the advantages thereof, may best be understood by reference to the following description taken in conjunction with the accompanying drawings in which:

FIG. 2 is a table illustrating a number of skip fire firing sequences that inherently isolate a cylinder in a particular engine having two cylinder banks with separate exhaust manifolds.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
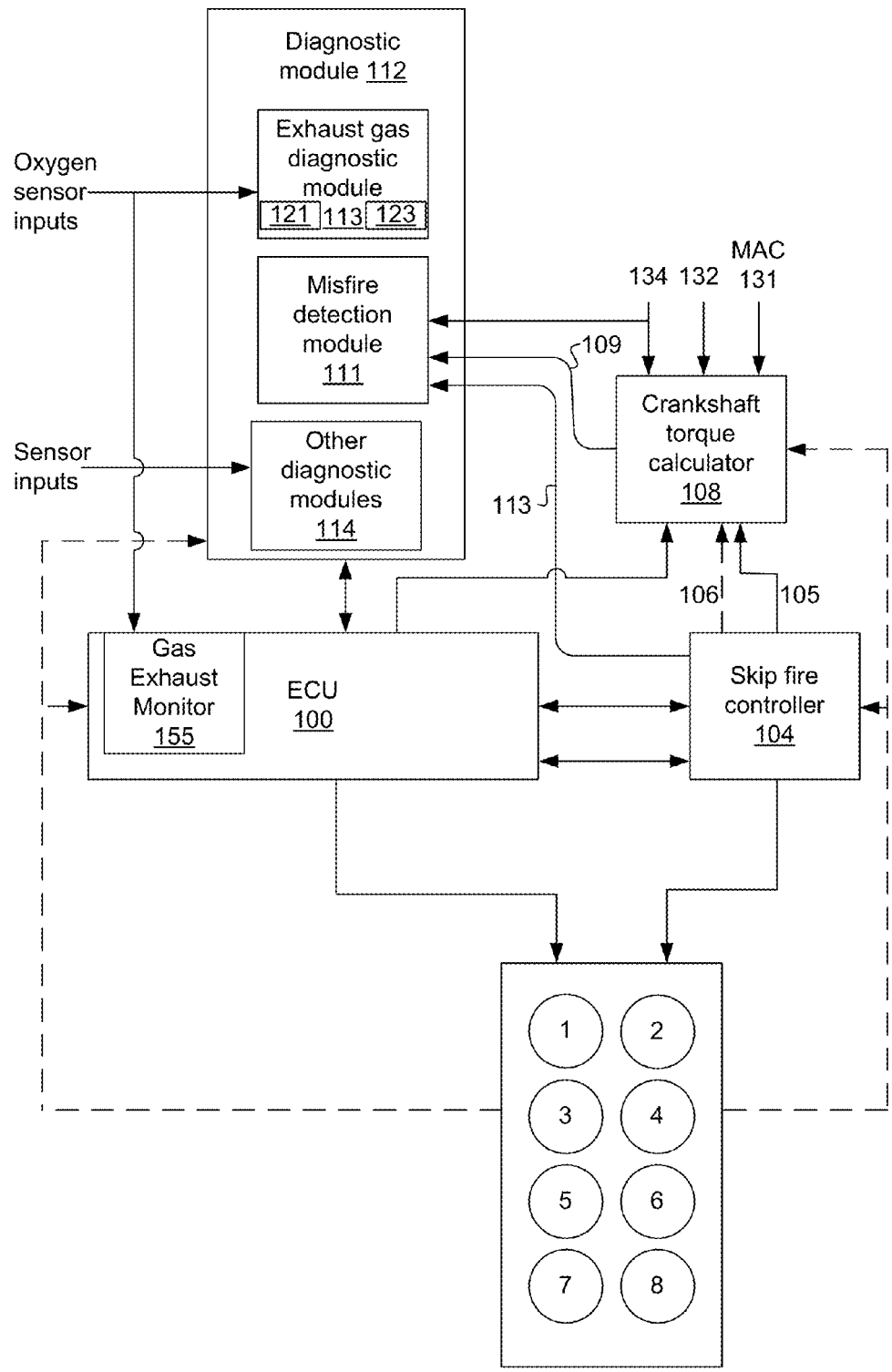
FIG. 1 is a functional block diagram of system suitable for diagnosing misfires and/or air-fuel ratio during skip fire operation of an engine.

The present invention relates generally to diagnostics in skip fire controlled engines. The skip fire controlled engines may be used to provide motive power for a vehicle.

Most modern passenger vehicles operate with four stroke, internal combustion engines. Such engines typically have a plurality of cylinders, which may be arranged in one or more banks Engine output is controlled by throttling the air flow into the engine so that all cylinders operate with substantially the same air intake level, the air intake level being reduced to reduce the engine output. Skip fire control provides a different method to control the engine output by firing some cylinders and skipping other cylinders so as to achieve the desired engine output.

Although the concept of skip fire control has been around for some time and its potential benefits with respect to fuel economy are known, to date, skip fire control has not achieved wide-spread acceptance. The applicant has developed a dynamic skip fire control technology that has the potential of making skip fire control of standard automobile engines practical and has filed a number of patent applications directed at various dynamic skip fire control arrangements and the integration of skip fire control into powertrain control in general. These include U.S. Pat. Nos. 7,954,474; 7,886,715; 7,849, 835; 7,577,511; 8,099,224; 8,131,445; 8,131,447; and 8,336, 521 U.S. patent application Ser. Nos. 13/309,460, 13/654, 217, 13/654,244, 13/774,134 and U.S. Provisional Patent Application Nos. 61/682,065; 61/677,888; 61/683,553; 61/682,151; 61/682,553; 61/682,135; 61/897,686; and 61/682,168; each of which is incorporated herein by reference in its entirety for all purposes. Many of these applications described dynamic skip fire control in which the determination of whether or not to fire a particular cylinder is made shortly before each working cycle begins.

In the diagnostics area there are a number of diagnostic techniques that can be improved by considering the firing history in the diagnosis. For example, misfire detection is one area that is typically targeted by on-board diagnostics and there are several OBD-II codes directed specifically at misfire detection. If conventional misfire diagnostics were used without modification for a skip-fire controlled engine, the diagnostics system would falsely report "misfires" due at least in part to intentionally skipped firing opportunities. Thus, it should be appreciated that there is a need to adjust the diagnostic algorithms to account for skip fire control. Further, skip fire operation can be advantageously used to help improve powertrain diagnostics.

As will be appreciated by those familiar with the art, conventional misfire detection algorithms are typically based on crankshaft acceleration or crankshaft speed variations. The crankshaft acceleration may be determined by measuring the crankshaft rotational speed during two adjacent time intervals and comparing the rotation speeds. The duration of the time intervals used to measure the rotational speed and their phase relative to top dead center (TDC) of cylinder 1, or any other crankshaft absolute orientation reference, may be adjusted to optimize diagnostic measurements. In general, when an engine is working properly during normal, all cylinder operation, the crankshaft acceleration pattern will remain relatively consistent from firing to firing. Each cylinder firing opportunity has an associated crankshaft acceleration magnitude and profile associated with its combustion stroke. Of course, the acceleration profile and the magnitude of the peaks will vary as a function of a number of operating parameters including (but not limited to) engine settings (such as mass air charge (MAC), spark timing, etc.), engine speed, gear and clutch engagement, powertrain load and other factors. However, in general, during steady state operation the profiles and peaks associated with each firing will be roughly consistent in shape and magnitude. In contrast, when a cylinder misfires, the crankshaft acceleration peak and profile associated with the misfiring cylinder will typically be noticeably different than those associated with "normal" firings. When such abnormalities are detected (and especially when such abnormalities are found to be repeating) by a diagnostic algorithm, a diagnostic misfire code will be generated.

The crankshaft acceleration profile that is generated during skip fire control can potentially look quite different than the consistent pattern experienced during normal all-cylinder operation. For example, if an engine is operated in a skip fire mode with a firing fraction of ⅓ (e.g., with each firing being followed by two skips), the cylinders may actually be fired during the first, fourth and seventh available firing opportunities, resulting in associated major acceleration peaks every third firing opportunity. The intervening cylinders are skipped and therefore at the times when combustion could have occurred, the variations in the crankshaft acceleration are much smaller. As will be appreciated by those familiar with the art, conventional misfire detection algorithms would interpret the lack of a major acceleration peak during the timeslots associated with the skipped firing opportunities as misfires and would presumably report such cylinders as misfiring when the frequency and/or magnitude of the misfire detections exceed the thresholds built into the misfire detection algorithm.

In order to substantially reduce or eliminate such false misfire detections, the misfire detection algorithm can be modified to take the actual firing history into account so that only fired cylinders are actually considered by the misfire detection algorithm. That is, when a cylinder is skipped, no effort is made to detect a misfire event with respect to that specific cylinder. In this way, the lack of the acceleration peaks during the timeslots associated with the missed firing opportunities will not be interpreted as misfires of the associated cylinders.

Furthermore, it should be appreciated that there are a number of factors which affect the crankshaft torque. For example, it requires energy to compress the intake air during the compression stroke and that energy comes from the crankshaft thereby acting as a negative torque on the crankshaft. Engines having multiple cylinders are generally designed with their working cycles out of phase with one another at consistent intervals so that the compression of one cylinder occurs while combustion is occurring in another cylinder. In normal, all cylinder operation, the torque generated by each firing, the torque required by each compression stroke, and other engine generated torques tend to be relatively constant during steady state operation. Therefore, the even spacing of the cylinder phases tend to result in each cylinder being affected in much the same way by events occurring in the other cylinders, which helps contribute to the consistency between the peaks and profiles associated with each firing opportunity during normal all-cylinder operation.

In skip fire operation, the effect of the other cylinders will not always be so consistent. For example, in some implementations the valves may be operated in a manner in which the intake and exhaust valves are opened in the normal sequence during "fired" working cycles and are both held closed through skipped working cycles. This will result in the forces applied to the crankshaft during each stroke of the working cycle being different during a skipped working cycle than would be seen during a fired working cycle. Most notably, during a skipped working cycle in which low pressure exhaust trapping is used, only a small amount of residual exhaust gases will remain in the cylinder and therefore the torque imparted during the compression stroke in a skipped working cycle will be quite different than the torque imparted during active (fired) working cycles because the relatively large negative torques required for compression of the intake gases will be missing during skipped working cycles. Since the compression stroke associated with one cylinder will typically overlap with the combustion stroke of another, the net torque experienced by the crankshaft during any particular combustion event will be affected by the firing decisions of other cylinders. Although the compression stroke tends to have greatest impact, the differential torques experienced during the intake and exhaust strokes may also be different in significant ways. For example, holding the intake valve closed during the skipped working cycle may cause a very low pressure to be developed in the cylinder during intake thereby imparting a larger negative torque during the intake stroke of a skipped working cycle than would occur during intake of an active (fired) working cycle.

Still further, different skip fire controllers may have different valve actuation schemes and/or may use a combination of different valve actuation schemes and such valve actuation schemes can further affect the torque variations experienced by the crankshaft. For example, if an exhaust valve is not opened after a combustion event, a "high pressure exhaust gas spring" may effectively be created within the cylinder combustion chamber by the trapped combustion gases. Such a high pressure spring will have a significant impact on the torque applied during all of the other strokes. The combustion gases may be trapped, albeit with some leakage around the valves and piston rings, until the exhaust valve is opened on some subsequent working cycle. In another example particularly relevant to direct injection engines, an intake valve may be opened in a working cycle in which no fueling or combustion occurs so that an air charge is trapped within the combustion chamber during a skipped working cycle. Such events will affect the net torque in yet another way. In still other circumstances sometimes referred to as "re-exhaust" it may be desirable to open the exhaust valve in the normal course after the firing of a cylinder and then to reopen the exhaust valve in a subsequent skipped working cycle such as the one that immediately precedes an active (fired) working cycle resulting in an extra exhaust valve opening event. In still other implementations, re-exhaust may be employed at the end of every skipped working cycle. Of course, a variety of other valve actuation schemes may be applied as well and it should be apparent that the timing and magnitude of the forces applied to the crankshaft will depend on the state of all of the cylinders.

The differential torques imparted by the skip/fire decision of other cylinders (and when used, different valve actuation schemes) can be significant enough to affect the misfire detection algorithm. Accordingly, in various embodiments described herein, the misfire detection algorithm is adapted to account for such expected torque variations.

When a cylinder misfires during skip-fire operation, the crankshaft acceleration peak and profile associated with the misfiring cylinder will typically be noticeably different than what would have been expected during a "normal" firing. When such abnormalities are detected (and especially when such abnormalities are found to be repeating) by a diagnostics algorithm, a diagnostic misfire code will be generated.

Referring next to FIG. 1, an engine diagnostics module in accordance with one representative embodiment will be described. In the figure a number of components are illustrated as separate functional blocks to facilitate a better understanding of the design. In some embodiments, they may actually be implemented as separate components. However, more often, many (or all) of the functional blocks will be integrated into a single component [e.g., an engine control unit (ECU) or power train control module (PCM)] or the functional blocks would be integrated in different configurations. In the illustrated embodiment, a diagnostics module 112 is arranged to cooperate with an engine controller 100, a skip fire controller 104, and crankshaft torque calculator 108. Engine controller 100 is arranged to control the engine in a generally conventional manner. When the engine is operated in a skip fire manner, the skip fire controller 104 is responsible for determining the firing sequence—that is, which cylinder working cycles to fire, and which to skip. For the purposes of the present invention, most any type of skip fire controller may be used as element 104. By way of example, any of the various skip fire controllers described in some of the referenced patents and patent applications as well as a wide variety of other skip fire controllers may be used for this purpose. When different types of valve actuation schemes are used, then the valve actuation scheme may also be determined by skip fire controller 104.

The diagnostics module 112 includes a misfire detection module 111, an exhaust gas diagnostic module 113, and any other desired and/or appropriate diagnostic modules 114.

Torque calculator 108 is arranged to calculate the expected crankshaft torque profile based on the current operational state of the engine using the engine controller's knowledge of the expected skip fire firing sequence and valve actuation strategy. The expected torque profile 109 is provided to the misfire detection module 111, which is part of a diagnostics module 112. The misfire detection module 111 is arranged to determine the crankshaft acceleration that is expected for each actual firing with the crankshaft acceleration that is measured and to detect misfires if and when they occur and to store and report the appropriate misfire diagnostics as desired.

As illustrated in FIG. 1, the torque calculator 108 determines the expected torque based on factors such as the mass air charge 131, the fuel charge 132, the firing sequence 105 (and when appropriate, the valve timing sequence 106), the engine speed 134 and any/or other factors deemed appropriate for the torque model. The mass air charge 131 and the fuel charge 132 can be received from the ECU 100. The firing sequence and the valve timing sequence can be received from the skip fire controller 104, and the engine speed 134 can be received from an engine speed sensor. Of course, it should be appreciated that in other embodiments, the expected torque can be calculated using other input variables (for example, cam timing and manifold absolute pressure (MAP) may be used in place of the MAC in various embodiments) and/or any of the inputs can be received from other suitable sources.

In the illustrated embodiment, the misfire detection module 111 receives the expected torque profile 109 from torque calculator 108, the firing sequence 113 from skip fire controller 104, and the actual engine speed 134. Based on these inputs, the misfire detection module calculates the expected crankshaft acceleration profile and compares the expected acceleration to the actual acceleration associated with the firing events. If the acceleration profile and/or peak acceleration associated with a particular firing does not relatively closely match the expected acceleration profile and/or the expected peak acceleration, then a potential misfire event is identified and that misfire event may be recorded and/or reported in accordance with the desired misfire detection protocol. It should be appreciated that the specific formulas used to calculate the expected crankshaft acceleration, the thresholds that are utilized to determine whether a misfire has occurred and/or whether to report a misfire occurrence are expected to vary widely with different engines and different diagnostics goals. Further, although the described embodiment contemplates looking at crankshaft acceleration, it should be appreciated that the misfire detection algorithm may be based on related parameters such as engine speed, crankshaft position, or crankshaft jerk (the derivative of acceleration). Alternatively, combinations of these parameters and/or other factors may be used in place of, or in addition to the crankshaft acceleration.

While the variability of the firing/skipping sequence may complicate detection of a misfire event, there are other aspects of skip fire control which simplify misfire detection. One attribute of skip fire operation is that the cylinder load on the firing cylinders is greater than the corresponding cylinder load during all cylinder operation. This increases the crankshaft acceleration associated with the firing event and makes discernment of a misfire easier, since the misfire will result in a greater change in the crankshaft acceleration profile.

The various components of the engine controller may be embodied in hardware or software. Often the engine controller includes a processor, memory and various computer code control algorithms arranged to be executed by the processor in order to perform the described functionality. Such code is typically stored in non-volatile memory accessible to the processor and makes use of various data stored in tables and other data structures that are accessible by the processor.

Exhaust Gas Monitoring

Some types of diagnostics are based on an analysis of the exhaust gases and such diagnostics will also be impacted by the firing sequence and valve actuation strategies. Fuel trim is one type of diagnostics that is based in part on the analysis of exhaust gases and there are several OBD-II algorithms and associated codes directed specifically at fueling malfunctions including the following:

P0170 Fuel Trim Malfunction (Bank 1).
P0171 System too Lean (Bank 1).
P0172 System too Rich (Bank 1).
P0173 Fuel Trim Malfunction (Bank 2).
P0174 System too Lean (Bank 2).
P0175 System too Rich (Bank 2).

Figure 5:
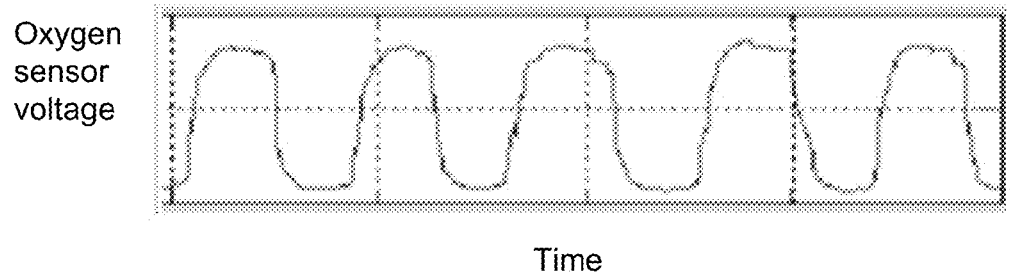
FIG. 5 is a graph illustrating a typical engine oxygen sensor output highlighting the cyclic nature of typical fuel trim control.

In many vehicles, the output of an exhaust gas oxygen sensor or lambda sensor is a key input in the engine fuel control feedback loop. In this application, the terms oxygen sensor and lambda sensor are used interchangeably as sensors capable of providing useful information regarding the content of the combustion gases and it should be appreciated that the nature of the specific exhaust gas sensor used is not critical to the invention. At least one oxygen sensor may be located in the exhaust system between the engine and catalytic converter. The ECU uses the oxygen sensor's output to balance the fuel mixture, leaning the mixture when the sensor reads rich and enriching the mixture when the sensor reads lean. The oxygen sensor output may be used to adjust the amount of fuel delivered to the firing cylinders to maintain substantially stoichiometric combustion conditions. This is typically accomplished by trimming a prescribed amount of delivered fuel or fuel charge as part of a fuel control feedback loop. The prescribed fuel charge will vary with engine parameters such as speed and MAC may be defined by a look up table or some other means. Typical acceptable trim values can range from 0.7 to 1.4, although larger and smaller trim values may be used. If the trim value is outside these limits for an extended period, a trim malfunction error code may be generated. An error code may also be generated if the trim values are within the prescribed limits, but they vary significantly between different banks or cylinders. Such errors may be described as a trim imbalance. As will be appreciated by those familiar with the art, the oxygen sensor's output voltage does not remain constant during normal operation. Rather, it tends to toggle back and forth from high to low as the air/fuel ratio is modulated from rich to lean to ensure that the catalyst does not become fully saturated in either a reducing or oxidizing state. By way of example, a typical oxygen sensor output under normal control is illustrated in FIG. 5. The output has the correct magnitude between the high and low signal levels, indicating correct function, and the output modulation tracks the modulation of the fuel/air ratio, indicating correct response.

If the average voltage from an oxygen sensor is running high, it indicates a rich condition possibly due to the introduction of unexpectedly low air charges (MAC) to the cylinder or over injection of fuel. If the average voltage reading is running low, the mixture is running lean, possibly due to a vacuum leak or because the sensor itself is bad. Regardless of the cause, when an abnormal oxygen sensor outputs occurs, the abnormality will be detected by the diagnostics algorithm and reported and/or handled in the desired manner.

When an exhaust event is skipped (due either to the skipping of a working cycle or the delay of an exhaust event), the oxygen sensor will be exposed to the exhaust gases from the previous firing opportunity for a longer period of time than it would in the ordinary course. This can potentially disrupt the fuel control feedback loop. Accordingly, it can be useful to take the firing and/or exhaust sequence into account in the exhaust gas monitoring diagnostics as well. As a specific example, adjusting individual cylinder fuel trim will be easier, since when the engine is skipping some cylinders the exhaust gases from each firing cylinder dwell for a longer period over the oxygen sensor. Also there will be less mixing of the exhaust between subsequent cylinder firings. Both these attributes allow more accurate sensing of the exhaust gas oxygen content in any cylinder firing.

Oxygen sensors may be positioned at different locations in the exhaust system in different vehicles and often multiple oxygen sensors are used. For example, in vehicles having two exhaust manifolds, it is common to provide one or more oxygen sensors in each exhaust manifold as well as secondary oxygen sensor(s) around the catalytic converter(s). By having separate oxygen sensors in each exhaust manifold in a V-configured engine, the right and left banks of the engine can be monitored independently of one another. However, because of the response time of the oxygen sensor and the fact that there is some mixing between exhaust gases from different exhaust events, it has conventionally been very difficult to diagnose the cylinders individually—particularly when the engine is operating at high engine speeds.

Skip fire control can be used to facilitate monitoring of exhaust gases independently by cylinder (or if desired, in various unique subsets of cylinders) during operation of the engine. Consider for example, a four cylinder engine with a single exhaust manifold and an oxygen sensor upstream of the catalytic converter. If the engine is run at a 25% firing fraction with a most even spacing of the firings, then every fourth cylinder would be fired. That is, the same cylinder would be repeatedly fired. Of course, the same result occurs when a specific firing pattern that only fires one cylinder is selected. When the same cylinder is repeatedly fired, then the exhaust gases will be limited to the exhaust from a single cylinder thereby allowing diagnostic analysis of a single cylinder. Such individual cylinder diagnostics can be performed on command as part of a specific diagnostics protocol (e.g., by commanding a particular firing fraction that isolates a cylinder or by commanding a particular firing sequence that isolates a cylinder). In addition, or alternatively, individual cylinder diagnostics can be performed opportunistically when the skip fire controller happens to command a firing fraction that isolates a cylinder (e.g., the 25% commanded firing fraction in a 4 cylinder engine).

Eight cylinder engines having two exhaust manifolds with individual oxygen sensors provide even more opportunities to isolate cylinders. By way of example, an eight cylinder engine operating at firing fractions of $\frac{1}{8}$, $\frac{1}{4}$, $\frac{3}{8}$, and $\frac{5}{8}$ with the most evenly spaced firings may result in repeating firing sequences that isolate one of the cylinders in a bank. Such sequences tend to have good NVH (noise, vibration, and harshness) characteristics and provide for more smooth torque production by the engine. One noticeable characteristic a most evenly spaced firings sequence that the number of skips between successive firings is at most different by one—although this does not fully define a most evenly spaced sequence. When such sequences are used (either opportunistically or by command), the exhaust gases associated with the isolated cylinder(s) can be analyzed thereby facilitating diagnosis of a single cylinder. More generally, any time a firing fraction that is an integer multiple of $\frac{1}{8}$ or $\frac{1}{16}$ is commanded under most even spaced firings, only a fixed set of cylinders will be fired. A firing fraction of $\frac{1}{8}$ causes the firing of a single cylinder which inherently isolates that cylinder. A firing fraction of $\frac{2}{8}$ causes the firing of two cylinders which can potentially be in the same bank or in different banks. When they are in different banks each cylinder can be independently analyzed. A firing fraction of $\frac{3}{8}$ causes the firing of three cylinder, which could all be in the same bank, or could be spread with two cylinders firing in one bank and a single cylinder being fired in the other bank. In such a case, the single cylinder being fired in the second bank can be independently analyzed and diagnosed. Even when the firing fraction is higher than $\frac{3}{8}$, there may be situations (either forced or by happenstance) where a single cylinder will be isolated in a repeating manner that is well suited for individual cylinder analysis and/or diagnosis.

Figure 2:
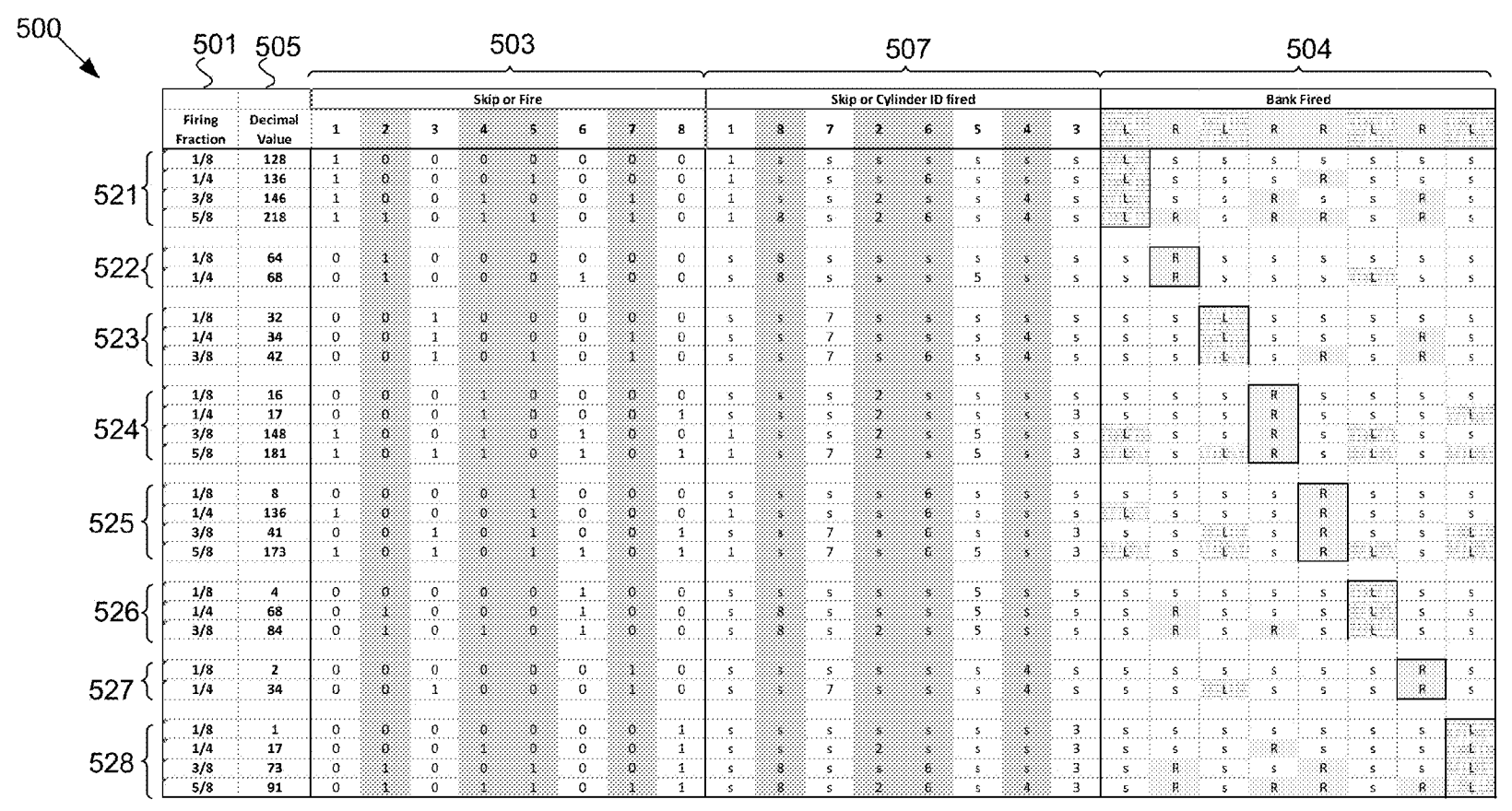

FIG. 2 is a table 500 illustrating the distribution of firing among specific cylinders at selected firing fractions (all integer multiples of $\frac{1}{8}$) that result in the isolation of a single cylinder in a particular engine design. The engine represented has a cylinder firing order of 1(L)-8(R)-7(L)-2(R)-6(R)-5(L)-4(R)-3(L) where "R" represents a cylinder in the right bank, and "L" represents a cylinder in the left bank. In the drawing, each row represents a distinct physical firing pattern. Column 501 indicates the firing fraction. Column set 503 includes a distinct column for each cylinder in sequential time order with entries in each row combining to indicate the order of the firings with "1's" representing fires and "0's" representing skips. In the illustrated example, each firing decision is a binary decision—i.e., skip or fire and therefore the 8 cylinder firing pattern amounts to a digital byte (8 bits) which has a corresponding decimal representation which is given in column 505. Column set 507 represents the same information as column set 503 in a different way. In this set, the columns are labeled with physical cylinder numbers in the order that they are fired, which in the example is the 1-8-7-2-6-5-4-3 firing order. In this set, fires are represented by "1's" and skips are each represented by an "s". Column set 509 represents the same information as column sets 503 and 507 but this time highlighting the bank fired. Thus, columns labeled "L" are located in the left column bank and columns labeled "R" are located in the right column bank. The entries for fired cylinders are labeled "L" if the cylinder is in the left bank and "R" if the cylinder is in the right bank. Entries for skipped cylinders are labeled "s".

The rows of are grouped in sets of firing sequences that each isolate a particular cylinder. Thus, for example, row set 521 shows the 4 firing sequences that isolate cylinder 1. Row set 522 shows the 2 firing sequences that isolate cylinder 8 (the second cylinder fired sequentially). Row set 523 shows the 3 firing sequences that isolate cylinder 7 (the third cylinder fired sequentially). Row set 524 shows the 4 firing sequences that isolate cylinder 2 (the fourth cylinder fired sequentially). Row set 525 shows the 4 firing sequences that isolate cylinder 6 (the fifth cylinder fired sequentially). Row set 526 shows the 3 firing sequences that isolate cylinder 5 (the sixth cylinder fired sequentially). Row set 527 shows the 2 firing sequences that isolate cylinder 4 (the seventh cylinder fired sequentially). Row set 523 shows the 4 firing sequences that isolate cylinder 3 (the eighth cylinder fired sequentially).

For the purposes of explanation, only the firing sequences of firing fractions that are multiples of 1/8 are shown. However, it should be appreciated that depending on the engine design, there may be a number of other firing fractions that will have the characteristics of isolating a single cylinder in a bank. For example, it the described embodiment, a firing fraction of 5/16 with a firing sequence of 00010010 01001001 has a repeating bank firing sequence of sssRssRs sRssRssL which means that physical cylinder #3 is the only cylinder in the left bank that will be fired and that it is fired every other one of its firing opportunities. Of course, there are a number of other such sequences as well.

Although table 500 is based on a particular 8 cylinder engine that is operated in accordance with a skip fire control approach that favors most evenly spaced firings, it should be appreciated that similar tables can be constructed for different engines and for engines that are operated using different types of skip fire control constraints, definitions or patterns. This includes engines having different numbers of cylinders; engines having more than two separately monitored exhaust manifolds (or exhaust manifold segments); engines run under other types of skip fire control, etc.

With this knowledge, several unique types of diagnostics can be performed. For example, if desired, the engine can be placed into a diagnostic skip fire mode during otherwise ordinary skip fire operation of the engine. That is, while a vehicle is being driven in the ordinary course using skip fire control, a diagnostic skip fire sequence may be selected that has a firing fraction that is high enough to deliver the desired torque, but that isolates one or more particular cylinders in their associated blocks for diagnostic purposes. For example, if the requested torque for the engine represented in FIG. 2 requires a firing fraction of at least 30%, the engine can be operated at a 3/8 firing fraction with suitable adjustments to other engine parameters such as manifold pressure, cam timing, fueling etc. to deliver the desired torque. In this state, all of the cylinders other than physical cylinder Nos. 4 and 8 can individually be tested as can be seen in table 500 (see, column set 507). If operating conditions allow operation at a firing fraction of 1/8 or 1/4, then all of the cylinders can be tested. And at an operational firing fraction of 5/8 physical cylinders 1, 2, 3 and 6 can be isolated for diagnostics. This ability to isolate particular cylinders for exhaust gas monitoring during otherwise normal operation of the engine while still delivering the desired engine output provides individual cylinder diagnostic, trim and/or other control opportunities that are not available in conventional vehicles.

When conditions are appropriate for isolated cylinder diagnostics in the skip fire mode, the skip fire controller can be directed to use a specific appropriate firing fraction and phase that isolates a first cylinder. Once that cylinder has been diagnosed, the phase of the firing sequence may be altered as necessary to isolate a second cylinder for diagnosis. This process can then be repeated to isolate each cylinder that can be isolated and diagnosed at the selected firing fraction. As long as the gradual transitions are made in the phase, the overall engine output will still substantially track the requested engine output during the diagnostics and vibration effects from the phase shift should be relatively minor.

When some of the cylinders cannot be isolated at a particular firing fraction while using most evenly spaced firings, then different firing sequences may be sequentially used to isolate the remaining cylinders and/or (when possible) different firing fractions may be used that do facilitate isolation of the remaining cylinders.

The described approach is a very powerful tool for engine diagnostics. During normal engine operation, there tend to be prolonged periods when the desired output of a skip fire controlled engine can be delivered using a firing pattern or firing fraction that facilitates isolation of a cylinder. By taking advantage of these periods, various diagnostics can be run during normal engine operation that would not be possible or would be more difficult to schedule during conventional all-cylinder operation.

In the example described above, it was contemplated that the engine is affirmatively directed to utilize a specific physical cylinder firing sequence in order to facilitate diagnostics. However, it should be appreciated that such diagnostics can also be done opportunistically when an engine happens to be placed in a mode that inherently isolates a single firing cylinder in an exhaust manifold bank. For example, some of Applicant's other patents and patent applications describe skip fire controllers that utilize a (sometimes variable) set of available firing fractions. If some of the available firing fractions have states that inherently isolate a cylinder in a bank (as for example, the 1/8, 1/4, 3/8, and 5/8 firing fractions in the engine represented in FIG. 2) then any time those firing fractions are commanded, a check can be made to determine whether the sequence phase that is currently being directed does indeed isolate a cylinder. If so, any desired individual cylinder diagnostics can be performed on the isolated cylinder.

To better understand the opportunistic approach, it should be appreciated that there are a fixed set of physical cylinder firing sequences for each possible firing fraction when the firing fractions are quantized and constrained to be the most evenly spaced for that particular firing fraction. This characteristic is further explained in U.S. Provisional Patent Application No. 61/801,472 entitled Managing Engine Firing Patterns and Pattern Transitions During Skip Fire Engine Operation, which is incorporated herein by reference. For firing fractions of 3/8, 1/2, and 5/8 in the engine represented in FIG. 5 of that application, some of those possible sequences (sequence states) will isolate a cylinder and some will not. Since the controller knows the firing sequence, it can readily determine whether the current state isolates a cylinder and if so, which cylinder is isolated. It should also be noted that when the engine represented in FIG. 5 is operated at a firing fraction of 1/4, the various sequences either isolate two cylinders (each in a separate bank) or no cylinders at all. Again, the controller can readily determine the current state. Of course, when two cylinders are isolated, both of the cylinders can be individually diagnosed at the same time.

Still further, there are a number of skip fire firing sequences that inherently have extended periods of firing cylinder isolation within a bank even when the physical cylinder firing pattern changes over time. When the expected sequence is either known or can be predicted, or after a past sequence is known, the diagnostics routine can identify periods in which a single cylinder was fired and use such information as part of an individual cylinder diagnostics.

The described exhaust gas diagnostics can be performed by an exhaust gas diagnostic module 113 within a diagnostics module 112, as illustrated, for example, in FIG. 1 or in a variety of other manners. In the illustrated embodiment, the exhaust gas diagnostic module 113 includes a Catalyst Efficiency Monitor 121 arranged to check the effectiveness of one or more of the catalysts in an exhaust system, as well and an Oxygen Sensor Response Monitor 123 arranged to check the effectiveness of one or more oxygen sensors in the exhaust system. The oxygen sensor response monitor 123 may include tests for both an oxygen sensor upstream or downstream from a catalyst.

The exhaust gas monitoring discussion above focuses primarily on diagnostics that can be performed opportunistically or otherwise, on isolated cylinders. In multi-bank engines (such as V-style engines), another feature of skip fire control is that their banks can sometimes be isolated such that none of the cylinders in that particular bank are fired. That is, in some firing pattern (e.g., at some firing fractions) none of the cylinders within a particular bank of cylinders will be fired. These, no fire bank isolations can be used to facilitate other types of diagnostics. Typically, it is desirable to deactivate the cylinders during the skipped working cycles so that neither air nor fuel is pump through the cylinders. However, when desired, the valves and fuel injectors associated with an "inactive" bank can be operated in a manner that facilitates diagnostics.

Figure 3:
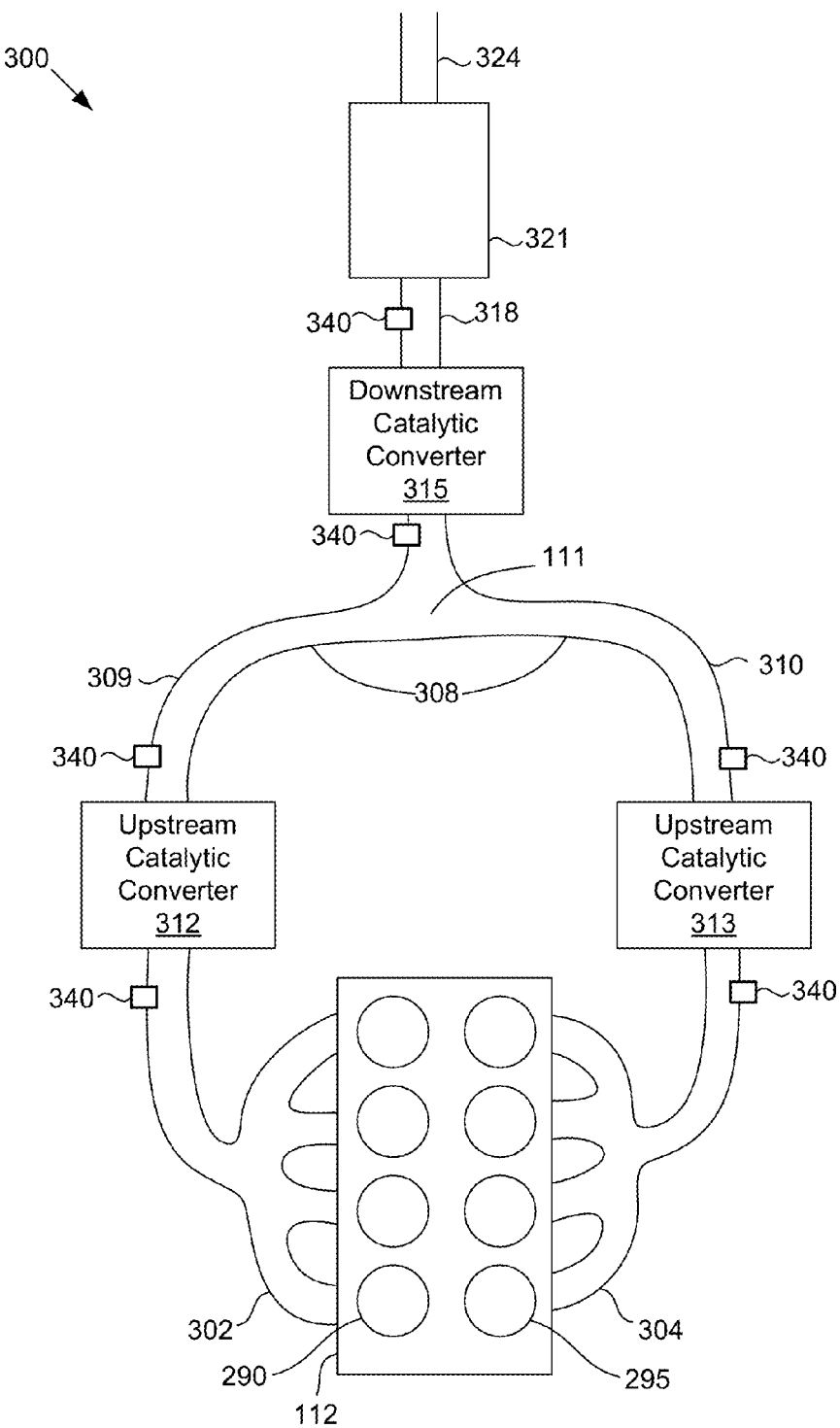
FIG. 3 is a diagrammatic illustration of a representative exhaust system for an engine having two cylinder banks.

To help illustrate some of the types of tests that can take advantage of bank isolation, it is helpful to consider the nature of modern exhaust systems. As will be appreciated by those familiar with the art, a wide variety of different exhaust systems are used in modern vehicles. By way of example, FIG. 3 illustrates a representative exhaust system that may be used in conjunction with an engine having two cylinder banks. The illustrated exhaust system 300 has a first exhaust manifold 302 that receives exhaust gases from a first cylinder bank 290 and a second exhaust manifold 304 that receives exhaust gases from second cylinder bank 295. An exhaust pipe, commonly referred to as a "Y" pipe 308 joins the exhaust manifolds and directs the exhaust gases from the exhaust manifolds to a downstream catalytic converter 315 (sometimes referred to as an "underbody" catalyst). In some systems, a Y-pipe catalytic converter 312, 313 is provided in each branch 309, 310 of the Y-pipe 308. These are sometimes referred to as "close coupled" or upstream catalysts. An exhaust pipe 318 carries the exhaust gases from the catalytic converter to a muffler 321 and the exhaust gases are discharged from the muffler 321 through tailpipe 324. A number of lambda (oxygen) sensors 340 are typically provided throughout the exhaust system to monitor the exhaust gases at various stages. Often, this will include sensors both upstream and downstream of each catalyst 312, 313, and 315. For the purposes of this patent, sensors located upstream of a catalyst are sometimes referred to as "front" or "upstream" sensors, and sensors located downstream of a catalyst are sometimes "rear" or "downstream" sensors.

While FIG. 3 shows an exhaust system with three catalysts 312, 313, and 315, it should be appreciated that many different configurations of oxygen sensors and catalysts are possible. In some engines with two banks catalysts 312 and 313 may be present, but catalyst 315 may be omitted. Alternatively catalysts 312 and 313 may be omitted and a single catalyst 315 may be present. For single bank engines a single catalyst may be used or two catalysts may be used in series. At least some of methods described herein are applicable for any exhaust system having an oxygen sensor and catalyst.

As pointed out above, the industry has developed a number of diagnostic monitors, tests and protocols for complying with government regulations that mandate monitoring the efficacy of the catalysts and sensors. Some of the tests require control of the exhaust gases in a manner that is difficult to perform when the engine is operating under a load in a normal manner. Some modern cars are arranged to cut off fuel delivery entirely for a period when the driver brakes or otherwise takes their foot off of the accelerator pedal. This is often referred to as deceleration fuel cut off (DFCO). Some diagnostic tests are designed to execute during and/or immediately after such DFCO events. This generally works because the engine is not required to deliver torque during such periods so there is some room to operate the engine under conditions suitable for conducting the tests.

The Catalyst Efficiency Monitor 121 and the Rear $O_2$ Sensor Response Monitor (which is one of the monitors embodied in Oxygen Sensor Response Monitor 123) are two of the many on-board diagnostics monitors that make use of deceleration fuel cut off events. Both the Rear $O_2$ Sensor Response and the Catalyst Efficiency monitors require a DFCO event that is long enough to fully deplete (Rear $O_2$ Slow Response monitor) or to saturate the catalyst completely with oxygen before the monitor can start (Catalyst Efficiency monitor). In addition, the monitors may also have many other entry conditions, such as catalyst temperature and air flow requirements, that need to be met. In some cases, a monitor needs three or more DFCO events in order to avoid false detection and insure monitor algorithm robustness. Additionally, some other monitors may compete for the same vehicle deceleration opportunity to complete. Therefore, under certain driving conditions, it is sometimes difficult to execute all the monitor algorithms often enough to meet the minimum completion rate requirements mandated by government regulations.

To better illustrate the advantages of conducting these types of tests during skip fire operation, the function of a typical Rear $O_2$ Sensor Response Monitor is described. The Rear $O_2$ sensor is an oxygen sensor located downstream of a catalyst. To determine the response of an oxygen sensor, one can evaluate the sensor voltage decay from a rich (oxygen depleted) environment (which corresponds to a high sensor voltage) to a lean (oxygen present) environment (indicated by a low sensor voltage). The response of a rear oxygen sensor, i.e. downstream of a catalyst, convolves the response of both the catalyst and the sensor. To measure a response for a downstream sensor, the catalyst itself must be close to fully depleted of oxygen to provide a rich environment and close to fully saturated with oxygen to provide a lean environment.

Figure 4:
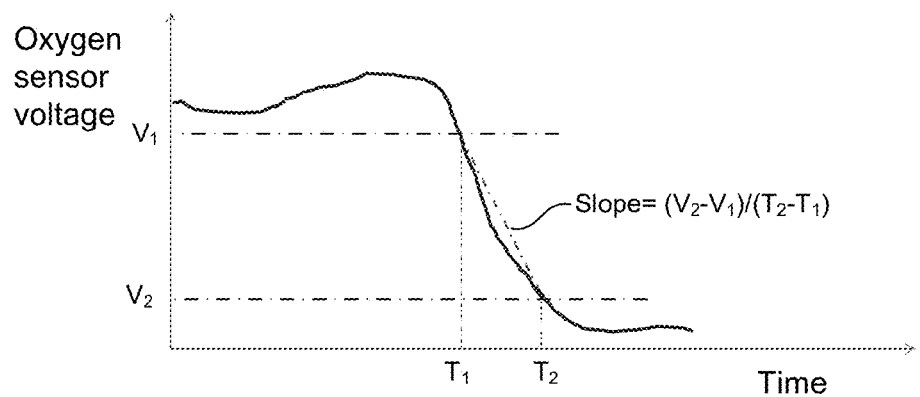
FIG. 4 is a graph illustrating the voltage output of an oxygen sensor during a response test.

One existing approach contemplates executing the Rear $O_2$ sensor test when a DFCO event is detected. In such a test, once a DFCO event is detected, the cylinders are run rich (instead of being cut off) for a period of time sufficient to deplete the oxygen in the catalyst(s) upstream of the sensor being tested. Once the catalyst oxygen is depleted, the exhaust gases passing the sensor will be rich, which results in a high voltage output from the rear oxygen sensor. Once the fuel rich (oxygen depleted) environment has been established, fuel to the cylinders is cut-off while the valves are still operated in a manner that causes air to be pumped through the cylinders. The air relatively quickly saturates the catalyst with oxygen thereby providing a lean environment which is reflected by the oxygen sensor as a low voltage output. The slew rate (slope) of the oxygen sensors' signal voltage decrease from rich to lean is reflective of the sensor's response convolved with that of the catalyst. The properly functioning catalyst and rear oxygen sensor may yield the result graphically illustrated in FIG. 4.

If the slope of the sensor response is too low, i.e. the sensor voltage does not drop quickly enough, it indicates a malfunction in the rear oxygen sensor (insufficient response). If the slope of the sensor is too high, i.e. the sensor voltage drops too quickly, it indicates a malfunction in the catalyst because it becomes saturated with oxygen too quickly.

Under skip fire control, such a test can readily be conducted using an isolated bank even during normal operation of the vehicle (i.e., without needing to wait for a suitable DFCO event to occur). That is, when a bank is isolated, that bank can be operated in the described manner to facilitate testing of any of the oxygen sensors in the bank's exhaust path. A further advantage of executing such tests during normal skip fire operation is that the throttle is typically open fairly wide during skip fire operation—whereas the throttle would typically be closed during a DFCO event. Therefore, when air is being pumped through the engine, the amount of air (MAC) passed through each skipped cylinder can be much greater than what is possible during DFCO when the throttle is closed. Additionally, the engine is typically rotating at a higher speed during normal operation than during a DFCO event. These factors permit air to be pumped through the catalysts more quickly, without needing to intrusively command throttle to open widely during such a diagnostics, which allows the sensor response test to be conducted faster and the transition from rich to lean to be steeper—both of which are desirable.

Another exhaust related test monitors the efficiency of the catalyst. In general, the vehicle is operated rich for the period of time necessary to transition the catalyst from an oxygen-saturated lean condition to a rich (fully depleted) condition. The Catalyst Efficiency monitor 121 determines the amount of excess fuel necessary to deplete the catalyst, which gives a good indication of its capacity. Like the Rear $O_2$ Sensor test described above, the Catalyst Efficiency monitor 121 often begins execution during a DFCO event. Specifically, the catalyst being tested is saturated during the DFCO event. When the fuel cut-off event ends, the cylinders are run rich and the monitor integrates the excess fuel to determine the capacity of the catalyst. It should be appreciated that skip fire bank isolations can be used to saturate the associated close coupled catalyst by pumping air through skipped cylinders during selected working cycles. When the bank becomes active again (either as directed in a test that dictates firings, or under normal control) cylinders in that bank are run rich and the catalyst capacity can be determined by tracking the amount of excess fuel in the cylinders in the associated bank necessary to deplete oxygen stored in the catalyst.

In many of the skip fire control systems described in the incorporated patents and patent applications, the cylinders can be deactivated individually on a firing opportunity by firing opportunity basis. This fine level of control of the valve actuation allows relatively precise levels of control of the amount of air pumped through the exhaust system at any time which tends to further alleviate environmental concerns.

Figure 6:
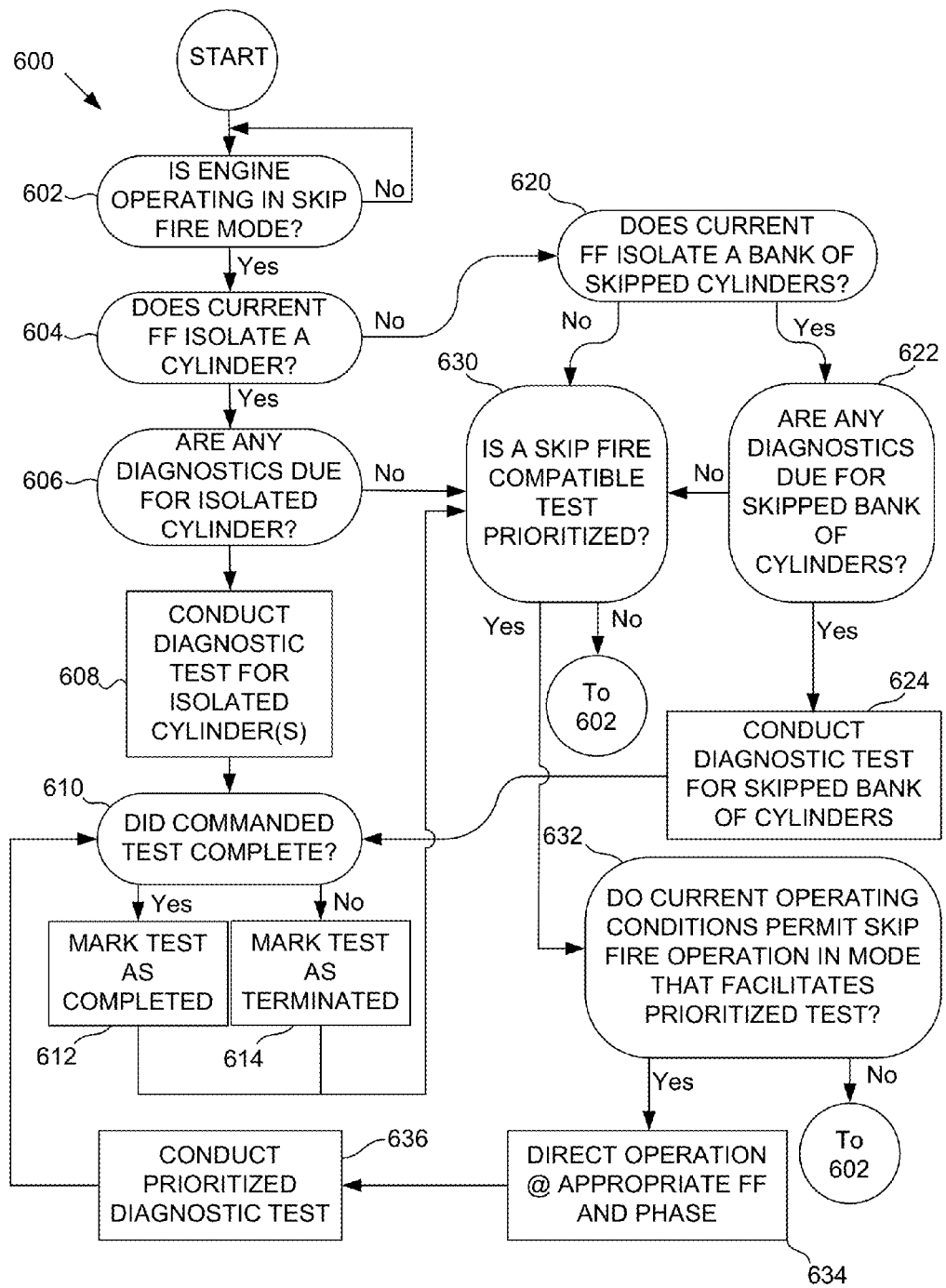
FIG. 6 is a flow chart illustrating a diagnostics scheduler suitable for directing execution of selected diagnostics during skip fire operation of an engine.

It will be appreciated that diagnostic monitors can readily be updated to take advantage of their knowledge of the actual and/or expected firing sequence. The actual algorithms used to schedule, direct and evaluate the results of various diagnostic routines may vary widely based on the needs of the specific monitors, manufacturer preferences, government regulations, etc. By way of example, FIG. 6 illustrates one method 600 of scheduling exhaust gas diagnostic monitors that take advantage of knowledge of the skip fire firing sequence when determining appropriate times to conduct specific diagnostic tests. The described steps can be conducted by a processor within diagnostic monitor 112, by ECU 100 or by any other suitable processing component. Of course there are many other ways that such tests can be scheduled and tracked.

Referring now to FIG. 6, a determination is first made regarding whether the engine is operating in a skip fire mode (602). If the engine is not operating in skip fire mode, the skip fire diagnostics scheduler simply waits until it detects skip fire operation and allows conventional diagnostics management to control the diagnostic routine scheduling. When the engine is operating in a skip fire mode, the current firing fraction and phase can be evaluated to determine whether any cylinders are isolated, and if so, which specific cylinders are isolated (604). The isolation can be an isolation of a single cylinder within a bank (or other group) of cylinders, isolation of a cylinder as the only firing cylinder within the engine, or in any other manner appropriate for the available tests. As previously mentioned, in some circumstances, two different cylinders may be isolated within their associated banks and in such cases both isolated cylinders can be noted.

If one (or more) cylinders are actually isolated, any isolated cylinder diagnostics for that cylinder can be opportunistically executed as long as the firing fraction or firing pattern remains unchanged. Thus, the scheduler may be arranged to check to see whether any diagnostics are due for the isolated cylinder (606). If diagnostics are due for the isolated cylinder and any other operating requirements for the test are met, the appropriate test(s) is/are conducted (608) on the isolated cylinder(s). In some implementations, it may be desirable to opportunistically conduct available diagnostics any time a cylinder is isolated, thereby eliminating the need for check 606. However, this can result in the test being repeated over and over as long as the engine is running at the same firing fraction—which may be undesirable for some tests. Therefore, in many instances it may be desirable for the scheduler to mark windows where execution of specific cylinder tests might be appropriate.

After the test has been commanded, a check can be made to determine whether the test actually completed (610). This check can be useful because many diagnostic tests may require several engine cycles to compete and it is possible that operating conditions may change in a manner that requires changes in the firing sequence, which may interfere with the test before the test is completed. Based on whether the test completes, the test is marked as completed (612) or uncompleted or terminated (614).

In addition to determining whether the current firing fraction and phase isolates a cylinder, a determination can also be made as to whether the current FF isolates a bank of skipped cylinders (620). If the current firing fraction/phase isolates a bank of skipped cylinders, then the scheduler can check to see whether any skipped bank based diagnostic tests are due for the skipped bank of cylinders (622). If such a test is due and any other operating conditions necessary to execute the test are met, the skipped bank test may be executed (624). Thereafter, the logic can flow to 610 to determine whether the test has been completed as previously described.

It should be appreciated that the order of the testing for isolated banks and isolated cylinders is entirely within the discretion of the diagnostic test designer and indeed such conditions can be identified in parallel, as for example on an event basis. There may even be times when a single cylinder is isolated in one bank, while no cylinders are fired in a second bank presenting the opportunity to conduct different types of tests at the same time.

Any time it is determined that the skip fire conditions are not right for an opportunistic diagnostic test that is due (e.g., as represented by the no branches of steps 606, 620 and 622) or after relevant opportunistic tests have been completed or terminated, a check can be made to determine whether any diagnostic tests that are compatible with skip fire operation have been prioritized for execution (630). By way of example, government regulations require that certain types of diagnostic tests and monitors need to be executed within specific intervals in every drive cycle. If time has passed and the diagnostics module has not had the opportunity to run a specific test during normal operation—running the test may become a priority and an appropriate flag may be set noting that the test needs to be executed if possible. If a prioritized test can be run during skip fire operation, and operating conditions permit, the engine can be commanded to operate using a skip fire firing pattern or firing fraction that insures the necessary condition (e.g., isolation of specific cylinders or banks) while still delivering the desired engine output. To facilitate this, the scheduler determines whether the current operating conditions permit skip fire control to deliver the requested engine output while at the same time providing the cylinder operating conditions necessary to facilitate execution of the necessary tests (632). If so, the diagnostics module 112 instructs the skip fire controller 104 (FIG. 1) to direct operation of the engine using the desired firing pattern, sequence or fraction (634). The prioritized diagnostic test is then conducted (636). Once the test has been commanded the logic can flow to 610 to determine whether the test has been completed as previously described.

If it is determined in 630 that no skip fire compatible tests are currently prioritized or in step 632 that current engine torque requirement or other operating conditions make it impractical to conduct the test during skip fire operation, then the logic can return to step 602 where the described approach continues until it is determined that the conditions are appropriate to conduct a diagnostic test during skip fire operation. Of course if execution of the test become mandatory, the test can be facilitated in the same manner needed tests are currently prioritized during all cylinder operation of an engine.

Although only a few specific embodiments of the invention have been described in detail, it should be appreciated that the invention may be implemented in many other forms without departing from the spirit or scope of the invention. For example, only a few specific monitor and diagnostic algorithms have been described. It should be appreciated that a number of other diagnostic algorithms can be improved by incorporating knowledge of the skip fire sequence and/or accounting for the influence of the skip fire sequence into the diagnostics algorithm.

The discussion above contemplates isolating a cylinder or banks of cylinders (such as a non-firing bank) for a period of time suitable to conduct a diagnostic test. The time period over which the isolation of a cylinder/bank is preferably maintained may vary widely based on the nature of a particular test. Often, it is desirable to maintain the isolation for several engine cycles, although that is not required for all diagnostic tests. By way of example, some tests, such as fuel trim, may require only a few engine cycles to complete, such as at least 5 engine cycles (10 crankshaft revolutions). Other tests, which involve saturating a catalyst, may require many more cycles, on the order of 100. The test durations may vary from less than a second to several seconds.

Although the invention has been described primarily in the context of misfire detection and exhaust gas monitoring, using knowledge of the skip fire firing sequence can be used in a variety of other applications as well. For example, knowledge of the firing sequence can be useful in emission management, injector circuit control, emissions control and idle control diagnostics as well.

Another diagnostic routine that, unmodified, would be negatively impacted by skip fire operation in conjunction with valve deactivation is airflow rationality. This diagnostic is commonly achieved by implementing several different airflow estimation schemes each depending on different sensor sets and comparing their outputs. If the airflows estimated by these two independent schemes do not match within some tolerance, a fault is declared in either or both of the sensor sets used for each airflow estimation scheme. For example, conventional "speed-density" air estimation utilize an intake manifold absolute pressure (MAP) and temperature along with engine rpm and cam phase to estimate the fresh air charge being inducted by engine cylinders. Another method of airflow estimation is based on a mass airflow (MAF). Each model may be used, possibly in conjunction with appropriate models of engine intake system components. In skip fire operation with valve deactivation, with each estimation scheme unaware of valve deactivation events, the two estimation schemes would produce quite different results; the speed-density approach would estimate more airflow being unaware that some valves are closed than the MAF sensor based approach which would detect the actual airflow. Co-pending U.S. patent application Ser. No. 13/794,157 assigned to applicant describes methods to accurately measure air flow and mass air charge and may be incorporated with the invention described herein.

There are some types of diagnostics that conventionally have been very difficult to perform during normal loaded operation of an engine operated in a conventional all cylinders firing mode. This is in part due to the response time of the sensors used as inputs in the diagnostic. Thus, several conventional diagnostic algorithms are designed to only execute during low speed operation of an engine. Operating an engine in a skip fire mode that delivers the desired engine torque can facilitate diagnostics that might not be practical during all cylinder operation. This can be in the form of analysis of an isolated cylinder as discussed above with respect to exhaust gas monitoring. Or it can simply be based on the knowledge that a certain number of preceding and/or following firing opportunities in the same bank or overall in the engine will be skipped, which inherently provides more time to an analyze the impact or effects of a single cylinder firing. Diagnostics to monitor and adjust individual cylinder fuel trim are a specific example of a test that benefits from the generally slower firing rate inherent in skip fire operation.

In many of the described embodiments the skip fire sequence that is used is described as being the sequence with the most evenly spaced firings that are possible at that particular firing fraction. A significant advantage of this approach is that the most even spacing tends to reduce vibration and harshness and thereby provide smoother and more desirable engine operation. Although most even spacing of the firings will be preferred in many implementations, when less rigorous constraints are made on the firing sequence, a greater number of firing patterns can be used to isolate a particular cylinder within a bank for sufficient time to perform a desired diagnosis. This tradeoff may be an acceptable compromise in many situations. For example, skip fire induced vibrations tend to be a bigger concern at lower engine speeds than at higher engine speed. Thus, a diagnostic algorithm may be arranged to direct the use of specific firing sequences that are not "most evenly spaced" when the engine is operating at higher engine speeds. This approach is particularly useful because there are a number of diagnostics techniques that currently cannot practically be performed while an engine is operating at a high engine speed. However, the isolation of a cylinder within a bank may give sufficient time to perform the diagnostics even when the engine is operating at a high speed. Therefore, the present embodiments should be considered illustrative and not restrictive and the invention is not to be limited to the details given herein, but may be modified within the scope and equivalents of the appended claims.

What is claimed is:

1. A method comprising:
    operating a engine in a skip fire manner to deliver a desired engine output; identifying a time period during skip fire operation that is suitable for initiating or performing a selected engine diagnosis, wherein the selected engine diagnosis utilizes a sensor that is associated with a group of cylinders and the identified time period is one selected from the group consisting of (i) a time period in which a single first cylinder in the group of cylinders is fired a plurality of times in isolation relative to the sensor used in the diagnosis, and (ii) a time period in which no cylinder in a first bank of cylinders associated with the sensor used in the diagnosis is fired over the course of at least one engine cycle while at least one other cylinder not associated with the first bank of cylinder is fired; and
    conducting or initiating the selected engine diagnosis during the identified time period while the engine is operated in a skip fire manner to deliver the desired engine output.

2. A method as recited in claim 1 wherein the time period is a time period in which a single first cylinder is fired a plurality of time in isolation relative to a sensor used in the diagnosis.

3. A method as recited in claim 2 wherein the engine diagnosis is a fuel trim diagnosis related to the first cylinder.

4. A method as recited in claim 2 wherein the engine diagnosis is a misfire diagnosis related to the first cylinder.

5. A method as recited in claim 2 wherein the engine diagnosis is a cylinder fuel trim imbalance.

6. A method as recited in claim 1 wherein the time period is a time period in which no cylinder in a first bank of cylinders associated with the sensor used in the diagnosis is fired over the course of at least one engine cycle while at least one other cylinder not associated with the first bank of cylinder is fired.

7. A method as recited in claim 6 wherein the selected diagnosis evaluates a catalyst in an exhaust path associated with the first bank of cylinders.

8. A method as recited in claim 6 wherein the selected diagnosis evaluates a sensor in an exhaust path associated with the skipped bank of cylinders.

9. A method as recited in claim 1 wherein the selected engine diagnosis is conducted opportunistically when it is determined that a firing sequence or firing fraction used during normal skip fire operation of the engine opportunistically provides the conditions appropriate for conducting the diagnosis.

10. A method as recited in claim 1 further comprising directing the engine to utilize a designated firing sequence during skip fire operation to facilitate execution of the selected engine diagnosis at a time when the designated firing sequence would not otherwise be used to thereby provide conditions appropriate for conducting the diagnosis.

11. A method as recited in claim 9 further comprising directing a firing sequence which does not have most evenly spaced firings.

12. A method as recited in claim 1 wherein the engine includes a crankshaft and the time period is at least 10 full rotations of the crankshaft.

13. A method as recited in claim 6 wherein the diagnosis includes the step of pumping air through the first bank of cylinders for a portion of the time period sufficiently long to saturate with oxygen a catalyst located in an exhaust path associated with the first bank of cylinders.

14. A method as recited in claim 6 wherein the diagnosis includes the step of passing excess or unburnt fuel through the first bank of cylinders sufficiently long to deplete a catalyst located in an exhaust path associated with the first bank of cylinders.

15. A method as recited in claim 1 wherein during skip fire operation, unfired cylinders are typically deactivated but are sometimes operated in a manner that pumps air through unfired cylinders as part of the selected engine diagnosis.

16. A method as recited in claim 1 wherein the identification of the time period is based at least in part on one selected from the group consisting of: an operational skip fire firing fraction; a skip fire firing pattern; or a skip fire firing sequence.

17. A method as recited in claim 2 further comprising:
    identifying an operational state where a second cylinder is fired a plurality of times in isolation relative to a second sensor during the time period; and
    conducting a second diagnosis on the second cylinder during the time period.

18. A diagnostics module for use in diagnosing a vehicle engine while the vehicle is being driven and the engine is being operated in a skip fire mode, the diagnostics module including computer code embodied in a computer readable media arranged to:
    identify a time period while the vehicle is being driven with the engine operating using skip fire control, that is suitable for initiating or performing a selected engine diagnosis, wherein the selected engine diagnosis utilizes a sensor that is associated with a group of cylinders and the identified time period is one selected from the group consisting of (i) a time period in which a single first cylinder in the group of cylinders is fired a plurality of times in isolation relative to the sensor used in the diagnosis, and (ii) a time period in which no cylinder in a first bank of cylinders associated with the sensor used in the diagnosis is fired over the course of at least one engine cycle while at least one other cylinder not associated with the first bank of cylinder is fired; and
    conduct or initiate the selected engine diagnosis during the identified time period while the vehicle is being driven with the engine operating using skip fire control.

19. An engine control unit that incorporates a diagnostic module as recited in claim 18.

20. A diagnostics module as recited in claim 18 wherein the time period is a time period in which a single first cylinder is fired a plurality of times in isolation relative to a sensor used in the diagnosis and the engine diagnosis includes at least one selected from the group consisting of:
    a fuel trim diagnosis related to the isolated cylinder;
    a misfire diagnosis related to the isolated cylinder; and
    a cylinder fuel trim imbalance diagnosis.

21. A diagnostics module as recited in claim 18 wherein the time period is a time period in which no cylinder in a first bank of cylinders associated with the sensor used in the diagnosis is fired over the course of at least one engine cycle while at least one other cylinder not associated with the first bank of cylinder is fired, and wherein the selected diagnosis evaluates at least one of:
    a catalyst in an exhaust path associated with the first bank of cylinders; and
    a sensor in an exhaust path associated with the skipped bank of cylinders.

22. A diagnostics module as recited in claim 21 wherein the diagnosis includes the step of pumping air through the first bank of cylinders for a portion of the time period sufficiently long to saturate with oxygen a catalyst located in an exhaust path associated with the first bank of cylinders.

23. A diagnostics module as recited in claim 21 wherein the diagnosis includes the step of passing excess or unburnt fuel through the first bank of cylinders sufficiently long to deplete a catalyst located in an exhaust path associated with the first bank of cylinders.

24. A diagnostics module as recited in claim 18 wherein the selected diagnosis is conducted during skip fire operation of the vehicle using most evenly space firings.

25. A diagnostics module as recited in claim 24 wherein the selected engine diagnosis is conducted opportunistically when it is determined that a firing sequence or firing fraction used during normal skip fire operation of the engine opportunistically provides the conditions appropriate for conducting the diagnosis.

26. A diagnostics module as recited in claim 25 wherein the identification of the time period for conducting the diagnosis is based at least in part on one selected from the group consisting of: an operational skip fire firing fraction; a skip fire firing pattern; or a skip fire firing sequence.

27. A diagnostics module as recited in claim 18 further comprising directing the engine to utilize a designated firing sequence during skip fire operation to facilitate execution of the selected engine diagnosis at a time when the designated firing sequence would not otherwise be used to thereby provide conditions appropriate for conducting the diagnosis.

28. A diagnostics module as recited in claim 27 further comprising directing a firing sequence which does not have most evenly spaced firings.

* * * * *